United States Patent
Liverman et al.

(10) Patent No.: US 7,634,938 B2
(45) Date of Patent: Dec. 22, 2009

(54) ADJUSTABLE FLOW NOZZLE FOR AIR FLOW METER

(75) Inventors: Ivan Neil Liverman, Middlesex, NC (US); Mark Edmund Maresh, Tucson, AZ (US); Christopher John Sattora, Cary, NC (US); Eric Allen Stegner, Durham, NC (US); Robert William Stegner, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 589 days.

(21) Appl. No.: 11/282,278

(22) Filed: Nov. 18, 2005

(65) Prior Publication Data

US 2007/0114691 A1    May 24, 2007

(51) Int. Cl.
*G01M 3/04* (2006.01)
(52) U.S. Cl. .............................. 73/38; 73/40; 264/40.1
(58) Field of Classification Search ...................... 73/38; 264/40.3
See application file for complete search history.

(56) References Cited

U.S. PATENT DOCUMENTS

| | | | |
|---|---|---|---|
| 268,996 A * | 12/1882 | Birkerhoff | ................ 604/198 |
| 3,613,962 A | 10/1971 | Gilmont et al. | ................ 222/43 |
| 4,469,109 A | 9/1984 | Mehl | ............................ 128/753 |
| 5,056,356 A * | 10/1991 | Kuhns et al. | .................. 73/49.2 |
| 5,250,026 A | 10/1993 | Ehrlich et al. | ................. 604/60 |
| 5,368,046 A | 11/1994 | Scarfone et al. | ............. 128/754 |
| 6,190,348 B1 | 2/2001 | Tiemann et al. | ................ 604/15 |
| 2003/0009132 A1* | 1/2003 | Schwartz et al. | ............ 604/152 |
| 2003/0014010 A1 | 1/2003 | Carpenter et al. | ........... 604/117 |

FOREIGN PATENT DOCUMENTS

EP    146514 A2 *    6/1985

* cited by examiner

*Primary Examiner*—Hezron Williams
*Assistant Examiner*—Mark Shabman
(74) *Attorney, Agent, or Firm*—Yee & Associates, P.C.; Steven L. Bennett

(57) ABSTRACT

The aspects of the present invention provides for an apparatus for conveying air into foam so that the flow of air within the foam may be monitored to determine one or more characteristics of the foam. The apparatus includes a nozzle and an adjustable member having a substantially planar surface. The nozzle is configured for operative connection to an air flow meter. The nozzle includes a tube sized and dimensioned to be inserted easily into the foam. The tube has a wall and an aperture formed in the wall. The aperture is sized and dimensioned to allow air to flow through the aperture and into the foam, and the aperture extends partially about the circumference of the tube. The adjustable member is operatively connected to the nozzle. The member adjusts axially to control the depth of insertion into the foam.

14 Claims, 2 Drawing Sheets

ADJUSTABLE FLOW NOZZLE FOR AIR FLOW METER

BACKGROUND OF THE INVENTION

1. Field of the Invention

The aspects of the present invention relate generally to the field of molded foams.

2. Description of the Related Art

Molded foam is one of the most common forms of packaging material used for the shipment of fragile items. Some examples of molded foams are expandable polystyrene (EPS), expandable polypropylene (EPP), and expandable polyethylene (EPE).

Molded foam is initially supplied to molders as a resin in the form of beads. The beads are loaded into a mold along with a blowing agent, such as pentane or carbon dioxide, which allow the beads to expand upon processing. Steam pressure is used to expand the beads into a shape determined by the mold and then force the beads to fuse together after expansion. The fused beads are then cooled to form a molded, closed-cell foam part.

The cushioning characteristic of the foam is based on the shape of the foam, the bead size, the bead processing conditions, and the quality of the bead fusion. Variations in these characteristics may cause the foam to fail acceptable quality standards, because foam that falls outside acceptable quality standards may not, for example, adequately protect products from damage when the foam is placed around these products.

The quality of the bead fusion strongly influences the strength characteristics of the foam. The degree of fusion or how much the beads have bonded during the molding process determines the quality of the bead fusion.

Currently, the most common method for determining bead fusion quality is a visual inspection. In order to inspect the core or middle of the molded foam piece, an inspector must break apart or cut the molded foam piece to visually inspect the bead fusion quality. As a result, the foam is rendered unusable. Currently, no known solutions exist to reliably and repeatedly test the quality of fused beads in a foam without destroying the foam.

Furthermore, current inspection techniques do not take into account the need to test differently sized and shaped foam. The test location in the molded foam is an important parameter for obtaining an accurate fusion bead quality reading. Since current techniques render the foam unusable anyways, an inspector only needs to further break apart or cut the molded foam to inspect other locations in the foam piece. However, no known solutions exist to reliably and repeatedly test the quality of fused beads of differently sized and shaped molded foam without destroying the foam.

BRIEF SUMMARY OF THE INVENTION

The aspects of the present invention provides for an apparatus for conveying air into foam so that the flow of air within the foam may be monitored to determine one or more characteristics of the foam. The apparatus includes a nozzle and an adjustable member having a substantially planar surface. The nozzle is configured for operative connection to an air flow meter. The nozzle includes a tube sized and dimensioned to be inserted easily into the foam. The tube has a wall and an aperture formed in the wall. The aperture is sized and dimensioned to allow air to flow through the aperture and into the foam, and the aperture extends partially about the circumference of the tube. The adjustable member is operatively connected to the nozzle. The member adjusts axially to control the depth of insertion into the foam.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
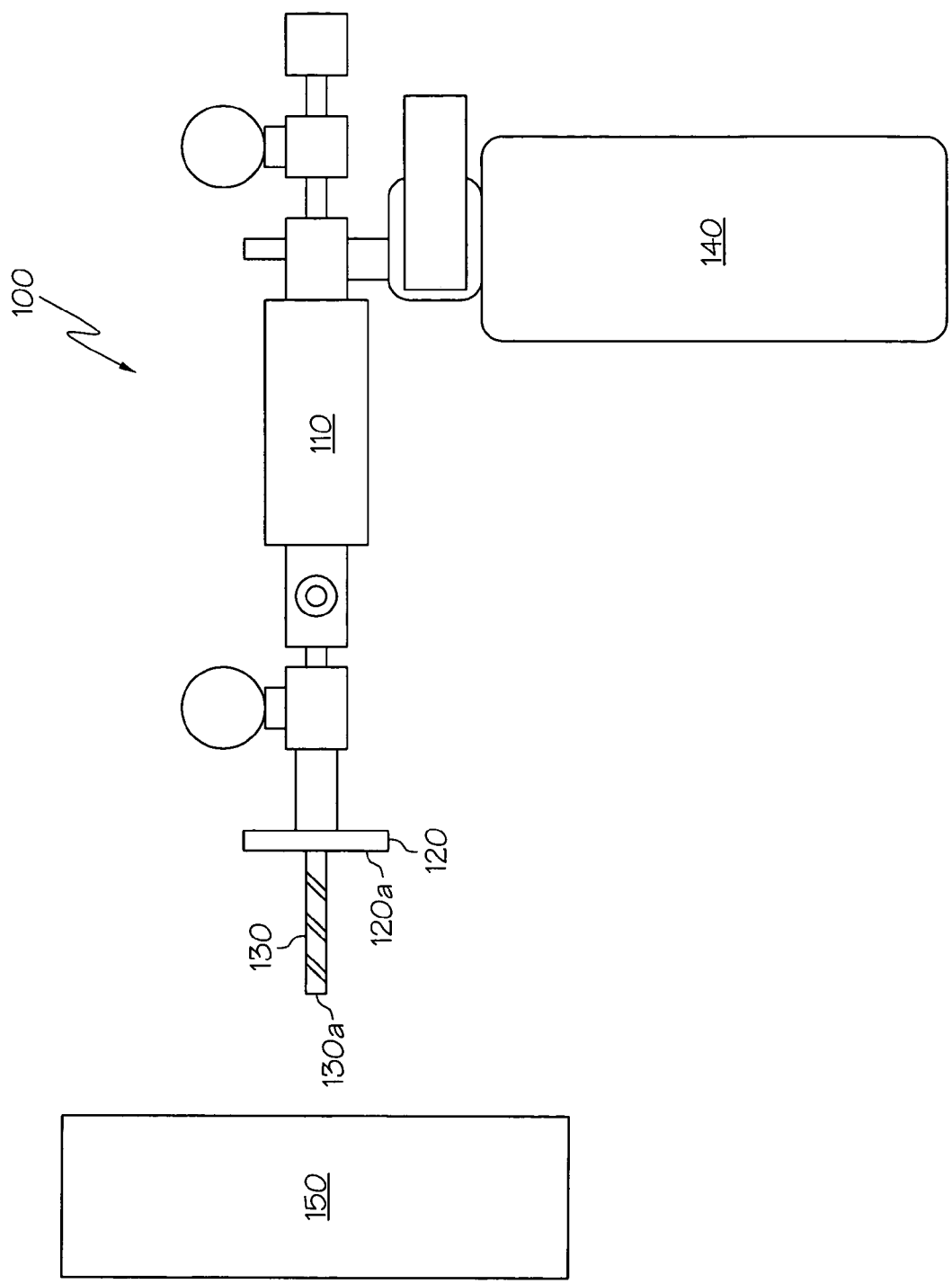
FIG. 1 shows a device for measuring the flow of air in foam, in accordance with an illustrative embodiment of the present invention.

FIG. 1 shows a device for measuring the flow of air in foam, in accordance with an illustrative embodiment of the present invention. Device 100 includes air flow meter 110, nozzle 130, and adjustable member having a substantially planar surface 120. Nozzle 130 and adjustable member 120 are configured for operative connection to air flow meter 110, and adjustable member 120 is operatively connected to nozzle 130. The term "operatively connected" means that components that are operatively connected to each other are connected and are in an operative or working condition in relation to each other. Components are connected if they are directly or indirectly connected to each other. Components are directly connected if each component is directly touching the other. First and second components are indirectly connected if other components are also connected to the first and second components, though the first and second components do not directly connect. In this case, nozzle 130 is directly and operatively connected to air flow meter 110. Adjustable member 120 is directly and operatively connected to nozzle 130. Therefore, adjustable member 120 is configured for and can be indirectly and operatively connected to air flow meter 110.

To test foam 150 for bead fusion quality, an appropriate depth of insertion into the foam is determined as the proper test location for the bead fusion quality. Member 120 is adjusted to position member 120 along nozzle 130, so that the distance between tip 130a of the nozzle and a side 120a of member 120 is equal to the desired depth of insertion. The tip of nozzle 130 is then inserted into foam 150. Nozzle 130 is inserted into foam 150 until the side 120a of member 120 abuts the external surface of foam 150. Member 120 is adapted to form a substantially air tight seal with the external surface of foam 150. Thus, member 120 is proximate to the point of insertion of nozzle 130.

An air source 140 supplies air to the device 100 and flows through air flow meter 110, member 120, and nozzle 130 into foam 150. Air meter 110 determines the rate of air flowing through device 100 into foam 150. The rate of air flowing in foam 150 may be used to provide a measure of the bead fusion quality of foam 150 and thus can also be used to indicate the strength characteristic of foam 150.

Figure 2:
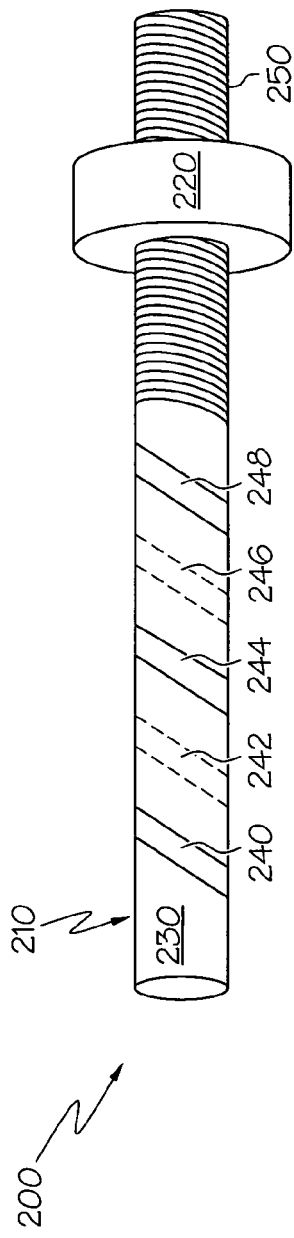
FIG. 2 shows an apparatus for conveying air into foam, in accordance with an illustrative embodiment of the present invention.

FIG. 2 is an apparatus for conveying air into foam, in accordance with an illustrative embodiment of the present invention. Apparatus 200 includes nozzle 210 and adjustable member with a substantially planar surface 220. Nozzle 210 includes tube 230 and apertures 240, 242, 244, 246, and 248. Tube 230 includes a rigid material, such as stainless steel, aluminum, acrylonitrile butadiene styrene (ABS), or any other metal alloy or resin based material. Tube 230 is sized and dimensioned so as to be inserted easily into the foam. In other words, tube 230 is thin and long enough to be inserted into the foam without causing unacceptable damage to the foam. The size and dimension of tube 230 will vary depending on the implementation. For example, the length of the tube will vary depending on the thickness of the foam to be tested, because the length should be approximately half the thickness of the foam. In the present embodiment, tube 230 is between 0.25 mm to 5 mm in diameter and 1 cm to 20 cm in length.

At the same time, tube 230 is made from a material able to maintain a rigid shape upon insertion. Tube 230 can have a pointed tip. Additionally, the cross section of tube 230 may be any number of shapes, including but not limited to a right circular cylinder, a right elliptical cylinder, or a triangular cylinder. Furthermore, tube 230 can have the same diameter or a gradually increasing or decreasing diameter distally or proximally relative to the air flow meter to which the tube is attached. In the illustrative embodiment, tube 230 is a right circular cylinder and has the same diameter throughout the length of tube 230.

Tube 230 can have one or more apertures. In the illustrative embodiment, tube 230 has a wall with apertures 240, 244, and 248 formed on one side of the wall and apertures 242 and 246 on the other side of the wall. In the illustrative example shown, apertures 240, 242, 244, 246, and 248 are not aligned behind each other. In addition, each aperture 240, 242, 244, 246, and 248 only partially extends about the circumference of the tube 230 in these illustrative examples. Additionally, apertures 240, 242, 244, 246, and 248 are distributed along the length of tube 230 so as to ensure the adequate distribution of air throughout the foam. Apertures 240, 242, 244, 246, and 248 may have the following shapes: circular, rectangular, a parallelogram, or any other shape. In illustrative example, apertures 240, 242, 244, 246, and 248 are parallelograms and evenly distributed along the length of tube 230.

Nozzle 210 can have threads 250 partially along the length of tube 230 at a point distal to the air flow meter. Adjustable member 220 is operatively connected to threads 250 and moves axially on threads 250. The adjustability feature of the member allows for the measurement of air flow rate at different insertion depths in the foam. A non-adjustable member is limited to the measurement of air flow rate at one depth within the foam. Additionally, the adjustability member allows for the member to measure foam of different sizes. A larger insertion depth may be required for large foam sizes, while a small foam piece may require a smaller insertion depth.

Adjustable member 220 is adjusted axially to an appropriate position on threads 250. The position of adjustable member 220 on threads 250 corresponds to the depth of insertion into the foam. A locking mechanism may be used to hold adjustable member 220 in place.

Also, adjustable member 220 has a substantially planar surface or a surface with a two-dimensional characteristic. Member 220 can be any number of shapes including, but not limited to a right circular cylinder, a right elliptical cylinder, or a triangular cylinder. Adjustable member 220 is adapted to form a substantially air tight seal with an external surface of the foam piece, proximate to a point of insertion of the nozzle 200. The air tight seal prevents the air from flowing outside the foam, thereby increasing the accuracy of the air flow reading within the foam. In the illustrative example, adjustable member 220 is made of a compliant material. A compliant material is any material that is pliable or capable of being shaped or slightly compressed under normal intended use for that material. Some compliant materials can return to their original shape when not compressed or bent. In this case, a compliant material can be a soft rubber, soft plastic, or some other material capable of making an air-tight seal against a material with the approximate hardness of expanded polystyrene. However, adjustable member 220 can also be made from a rigid material or a combination of a rigid and compliant material. A rigid material may be a metal alloy, a plastic resin, or any combination thereof.

Figure 3:
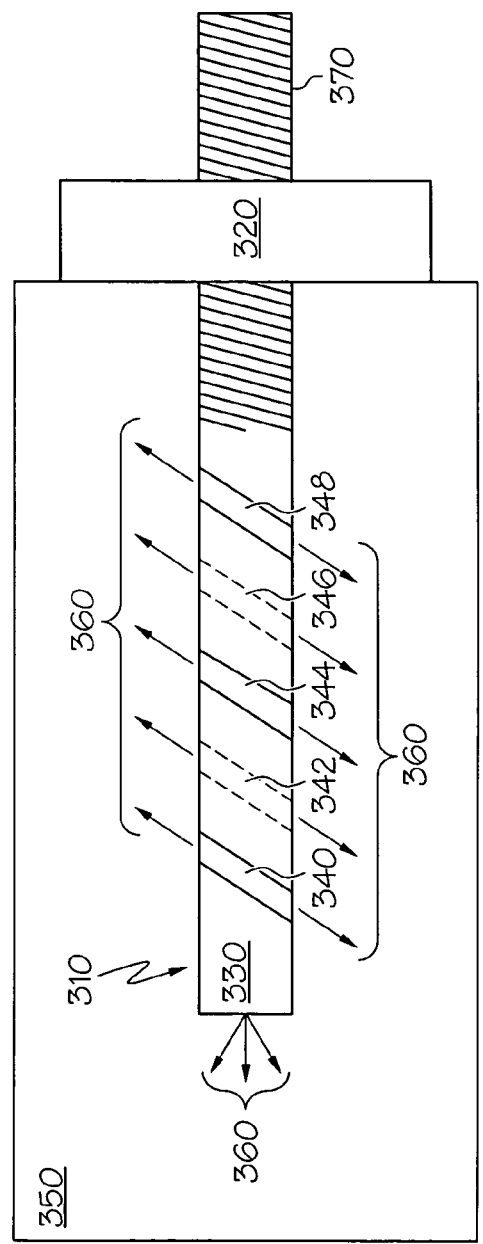
FIG. 3 is a test scenario in which an illustrative embodiment of the present invention may be implemented.

FIG. 3 depicts a test scenario in which the illustrative embodiment may be implemented. In use, nozzle 310, including tube 330 and apertures 340, 342, 344, 346, and 348, is inserted into foam 350. In the illustrative embodiment, nozzle 320 has threads 370 and member 320 is operatively connected to threads 370. Member 320 is adjusted and positioned to the appropriate insertion depth. Nozzle 310 stops at the point when the side or face of member 320, as viewed in FIG. 3, abuts the external surface of foam 350, thereby positioning nozzle 310 at the desired insertion depth in foam 350.

Member 320 is adapted to form a substantially air tight seal with the external surface of foam 350. The substantially air tight seal prevents the air from flowing outside the foam, thereby increasing the accuracy of the air flow reading within foam 350.

Apertures 340, 342, 344, 346, and 348 allow for the adequate distribution of air through foam 350. Apertures 340, 342, 344, 346, and 348 allow for better air flow 360 readings in case a particular bead within foam 350 blocks the air passage of one of apertures 340, 342, 344, 346, or 348. In other words, an air flow meter will read a lower rate of air flow if an aperture is blocked. For example, if nozzle 330 only had one aperture, and that aperture was blocked by a bead, then the air flow meter would record a lower air flow rate 360 than what might actually be present in foam 350. Multiple apertures reduce the chance that all air flow from the nozzle will be blocked by individual beads.

In use, a method of measuring the density of foam 350 includes identifying an insertion depth in foam 350 and adjusting member 320 to the identified depth of insertion. Next, nozzle 310 is inserted into a point of insertion in foam 350. At that point, member 320 forms a substantially air tight seal with an external surface of foam 350. Air is routed from an air source and is disbursed throughout apertures 340, 342, 344, 346, and 348. Airflows 360 move around the fused beads and an air flow measurement is obtained. The bead fusion quality determines how well the beads fused or bonded during molding and is calculated based on the air flow reading.

The aspects of the present invention provide an apparatus for determining one or more characteristics of the foam by conveying air into foam. The flow of air within the foam is monitored. The density and the strength characteristic of the foam are determined using the flow of air within the foam.

The apparatus includes a nozzle and an adjustable member having a substantially planar surface. The nozzle and adjustable member are operatively connected together. The nozzle is configured to be directly connected to an air flow meter. The nozzle includes a tube which is sized and dimensioned to be inserted easily into the foam. The tube has a wall and one or more apertures in the wall. The apertures are sized and dimensioned to allow air to flow through the apertures and into the foam. In an illustrative example, the apertures extend partially about the circumference of the tube. Also, in an illustrative example, the tube is threaded at a point distal to the air meter, and the member is operatively connected to the threaded portion of the tube. The member is adjustable and moves axially along the length of the tube. The member is adjusted to the point corresponding to the depth of insertion. After the nozzle is inserted into the foam, the member forms a substantially air tight seal with the external surface of the foam.

The aspects of the present invention allow for a reliable, repeatable, and non-destructive method for determining the density of foam. The method does not require an inspector to break apart or cut the foam to visually inspect the fusion bead density level. A visual inspection is subjective and does not produce a quantitative, objective measurement. Consequently, a visual inspection may produce greater variability in quality results than a quantitative measurement. The present invention gives an objective measurement which can be tested repeatedly to verify foam density results. Furthermore, because the foam is not destroyed in the testing process, the same foam can be repeatedly tested to further increase the reliability of the test results. In addition, the aspects of the present invention allow the foam to be used as intended to protect fragile items in shipment and not rendered unusable as would have been in a visual inspection. Moreover, the aspects of the present invention allow for foam of different sizes to be tested using the same air flow apparatus. The apparatus does not need to change to obtain different insertion depths, because the member is adjustable and controls the depth of the insertion of the apparatus.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of measuring flow of air in a foam, the method comprising the steps of:
   identifying a depth of insertion in the foam;
   adjusting a flange member to the identified depth of insertion, wherein the flange member has a substantially planar surface adapted to form a substantially air tight seal when abutting an external surface of the foam, and wherein the flange member is directly connected to a nozzle;
   inserting the nozzle into a point of insertion in the foam, wherein the nozzle comprises:
   a tube sized and dimensioned to be inserted into the foam, said tube having a wall; and
   an aperture formed in the wall of the tube, wherein the aperture is sized and dimensioned to allow air to flow through the aperture and into the foam, and wherein the aperture extends partially about the circumference of the tube;
   using the planar surface of the flange member to form a substantially air tight seal with the external surface of the foam, proximate to the point of insertion of the nozzle;
   receiving air from an air source; and
   disbursing the air through the aperture, thereby causing the air to flow around fused beads of the foam;
   using an air flow meter to measure the air flow around the fused beads in the foam to obtain a measurement of air flow, wherein the air flow meter is directly connected to the nozzle to allow unimpeded flow between the air flow meter and the nozzle; and
   determining the density of the fused beads based on the measurement of air flow.

2. The method of claim 1 wherein the nozzle is threaded, distal to the air flow meter.

3. The method of claim 2 wherein the member is operatively connected to the threads on the nozzle and wherein the member adjusts axially along the threads.

4. The method of claim 3, further comprising locking, by a locking mechanism, to hold the member in place.

5. The method of claim 1, wherein the flange member comprises a compliant material.

6. The method of claim 1, wherein the tube further comprises a plurality of apertures evenly distributed along the length of the nozzle.

7. The method of claim 1, wherein the tube further comprises the aperture having the shape of a parallelogram.

8. An apparatus for measuring flow of air in a foam, the apparatus comprising:
   an air source;
   a nozzle having a tube that is sized and dimensioned to be inserted into the foam, wherein the tube has a wall;
   an adjustable flange member directly connected to the nozzle, wherein the flange member has a substantially planar surface adapted to form a substantially air tight seal when abutting a surface of the foam, and wherein the flange member adjusts axially to control a depth of insertion of the nozzle into the foam;
   an aperture in the wall of the tube, wherein the aperture is sized and dimensioned to allow air to flow into the foam, and wherein the aperture extends partially about a circumference of the tube; and
   an air flow meter directly connected to the nozzle to allow unimpeded flow between the air flow meter and the nozzle.

9. The apparatus of claim 8 wherein the nozzle is threaded, distal to the air flow meter.

10. The apparatus of claim 9 wherein the flange member is operatively connected to the threads on the nozzle and wherein the flange member adjusts axially along the threads.

11. The apparatus of claim 10 further comprising a locking mechanism to hold the flange member in place.

12. The apparatus of claim 8 wherein the flange member comprises a compliant material.

13. The apparatus of claim 8 wherein the nozzle further comprises a plurality of apertures evenly distributed along the length of the nozzle.

14. The apparatus of claim 8 wherein the nozzle further comprises the aperture having the shape of a parallelogram.

* * * * *

UNITED STATES PATENT AND TRADEMARK OFFICE
CERTIFICATE OF CORRECTION

| | |
|---|---|
| PATENT NO. | : 7,634,938 B2 |
| APPLICATION NO. | : 11/282278 |
| DATED | : December 22, 2009 |
| INVENTOR(S) | : Liverman et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 988 days.

Signed and Sealed this

Ninth Day of November, 2010

David J. Kappos
*Director of the United States Patent and Trademark Office*